US012756783B2

(12) United States Patent
Hirose

(10) Patent No.: US 12,756,783 B2
(45) Date of Patent: Oct. 6, 2026

(54) INFORMATION PROVIDING SYSTEM AND METHOD

(71) Applicant: CANON KABUSHIKI KAISHA, Tokyo (JP)

(72) Inventor: Takuma Hirose, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 18/806,850

(22) Filed: Aug. 16, 2024

(65) Prior Publication Data

US 2025/0080660 A1 Mar. 6, 2025

(30) Foreign Application Priority Data

Sep. 5, 2023 (JP) ................................ 2023-143724

(51) Int. Cl.
*G06F 11/00* (2006.01)
*H04N 1/00* (2006.01)

(52) U.S. Cl.
CPC ..... *H04N 1/00029* (2013.01); *H04N 1/00344* (2013.01)

(58) Field of Classification Search
USPC ........ 358/1.1–3.29; 714/100, 1–57, 699–799
See application file for complete search history.

(56) References Cited

U.S. PATENT DOCUMENTS 5,488,715 A * 1/1996 Wainwright ......... H04Q 3/0075 714/4.3
7,050,941 B2 * 5/2006 Wada .................. G06F 11/2294 714/25
2009/0106603 A1 * 4/2009 Dilman ................. G06F 11/327 714/E11.002
2009/0199045 A1 * 8/2009 Kasubuchi .......... G06F 11/3684 714/E11.029
2010/0083029 A1 * 4/2010 Erickson ............... G06F 11/079 714/2
2013/0094038 A1 * 4/2013 Okamoto ........... H04N 1/00307 358/1.9
2014/0026002 A1 * 1/2014 Haines ................ G06F 11/0769 714/57

(Continued)

FOREIGN PATENT DOCUMENTS

JP 200762288 A 3/2007
JP 2020199704 A 12/2020

*Primary Examiner* — Marcellus J Augustin
(74) *Attorney, Agent, or Firm* — Venable LLP

(57) ABSTRACT

An information providing system manages treatment data representing treatments performed for resolving errors that have occurred in an image forming device in the past and evaluation data representing evaluations of the treatments performed for resolving the errors that have occurred in the image forming device in the past as results, identifies treatments required for resolving an error that has occurred in the image forming device, controls display of a priority level representing an extent to which each of the identified treatments is performed with priority, and further manages evaluation data representing an evaluation of each of the identified treatments as the results, in which, in the display of the priority level, control of causing a display form to be different between a treatment satisfying a first condition that an evaluation exceeding a predetermined level has been received over a predetermined number of times and a treatment not satisfying the condition is performed.

8 Claims, 13 Drawing Sheets

(56) References Cited

U.S. PATENT DOCUMENTS

| | | | | |
|---|---|---|---|---|
| 2015/0149623 | A1* | 5/2015 | Numata | H04L 67/125<br>709/224 |
| 2019/0146901 | A1* | 5/2019 | Hoover | G06F 16/35<br>714/38.1 |

* cited by examiner

INFORMATION PROVIDING SYSTEM AND METHOD

BACKGROUND OF THE INVENTION

Field of the Invention

The present invention relates to an information providing system and a method.

Description of the Related Art

Conventionally, systems managing information, states and the like of devices such as printers have been built. In such a system, when a failure occurs in a device, a notification of the failure transmitted from the device is received by a server, whereby a situation of occurrence of the failure can be managed. In addition, as a technology similar to such a system, a technology for making a diagnosis of a failure by analyzing details of the failure is proposed. For example, Japanese Patent Laid-Open No. 2020-199704 discloses a system that receives a failure diagnosis result transmitted from a device and displays guidance for replacement of a failed part from results of replacement operations in the past. In addition, for example, Japanese Patent Laid-Open No. 2007-62288 discloses a system that allows a user of a failed device to input and transmit information relating to a failure status of the device, improves accuracy of a failure diagnosis using received detailed information, and updates a display sequence of treatments for the device.

A user such as a customer engineer (CE) can perform a treatment operation by referring to a recommended treatment displayed as a result of a failure diagnosis. However, depending on the situation of a device, there are cases in which a treatment operation determined by a user as being optimal on the basis of knowledge and experience deviates from a treatment recommended on the basis of the result of the failure diagnosis. As reasons for occurrence of such a deviation, there are occurrence of a deviation between master information for managing recommended treatments and a user's recognition, insufficient master information for a new model or the like, and the like. In addition, in such cases, a user can input a result indicating whether an operation has been performed in accordance with a failure diagnosis result or an operation has been performed on the basis of his or her judgment without following the failure diagnosis result to feedback and can transmit the feedback to the system. However, the user cannot recognize whether or not the transmitted feedback has an influence on information of a treatment recommended on the basis of the failure diagnosis result.

SUMMARY OF THE INVENTION

An objective of the present invention is to provide an information providing system and a method through which a degree of reflection of feedback to a system managing printers and the like can be visualized on the system.

In order to solve the problems described above, according to the present invention, there is provided an information providing system including: a result managing unit configured to manage treatment data representing treatments performed for resolving errors that have occurred in an image forming device in the past and evaluation data representing evaluations of the treatments performed for resolving the errors that have occurred in the image forming device in the past as results; a treatment identifying unit configured to identify treatments required for resolving an error that has occurred in the image forming device; a display unit configured to display a priority level representing an extent to which each of treatments identified by the treatment identifying unit is performed with priority; and a feedback unit configured to receive the evaluation data representing an evaluation of each of the treatments identified by the treatment identifying unit, cause the result managing unit to manage the evaluation data as the results, and perform control of a display device to cause an appearance in which the priority level is displayed to be different between a treatment satisfying a condition that an evaluation exceeding a predetermined level has been received over a predetermined number of times and a treatment not satisfying the condition.

Further features of the present invention will become apparent from the following description of exemplary embodiments with reference to the attached drawings.

DESCRIPTION OF THE EMBODIMENTS

Figure 1:
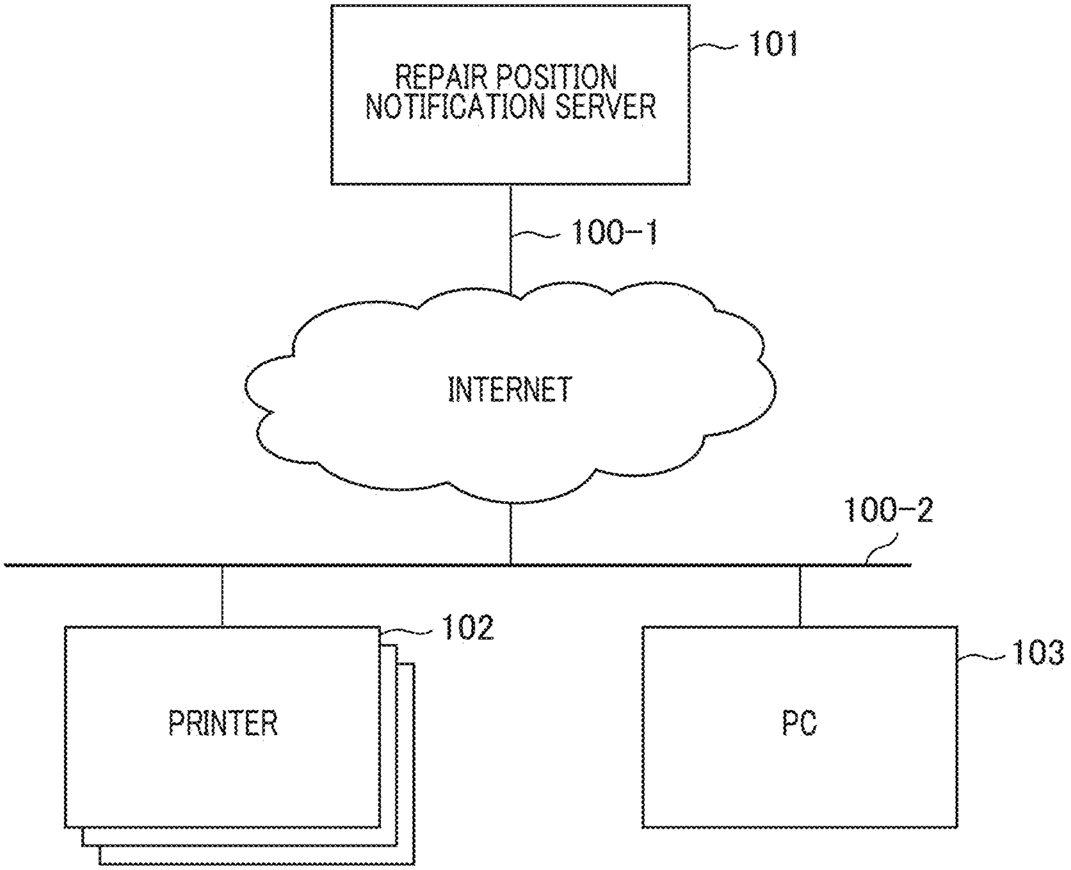
FIG. 1 is a block diagram illustrating a configuration of a repair place notification system according to a first embodiment.

An information providing system according to an embodiment is an information providing system including: one or more memories storing instructions, and one or more processors capable of executing the instructions causing the information providing system to: manage treatment data representing treatments performed for resolving errors that have occurred in an image forming device in the past and evaluation data representing evaluations of the treatments performed for resolving the errors that have occurred in the image forming device in the past as results; identify treatments required for resolving an error that has occurred in the image forming device; control display of a priority level representing an extent to which each of the identified treatments is performed with priority; and further manage evaluation data representing an evaluation of each of the identified treatments as the results; in which, in the display of the priority level, control of causing a display form to be different between a treatment satisfying a first condition that an evaluation exceeding a predetermined level has been received over a predetermined number of times and a treatment not satisfying the condition is performed.

The treatment data of at least one of the identified treatments is further managed as the results, in the display of the priority level, control of displaying a predetermined icon for a treatment satisfying a second condition of being executed over a predetermined number of times may be performed.

The treatment data representing a treatment of which the priority level is not displayed may be managed without being processed as the results.

If treatment data representing a treatment of which the priority level is not displayed is received, the evaluation of the treatment may not be changed.

If treatment data representing a treatment of which the priority level is not displayed is received for the first time, a value represented by the evaluation data of the treatment may be managed as zero.

If treatment data representing a treatment of which the priority level is not displayed is received, the display form of the priority level of the treatment may not be changed.

If treatment data representing a treatment of which the priority level is not displayed is received, the evaluation data of the treatment may be further managed as the results.

A method according to an embodiment includes: managing treatment data representing treatments performed for resolving errors that have occurred in an image forming device in the past and evaluation data representing evaluations of the treatments performed for resolving the errors that have occurred in the image forming device in the past as results; identifying treatments required for resolving an error that has occurred in the image forming device; and controlling of display of a priority level representing an extent to which each of the identifier treatments is performed with priority; and further managing evaluation data representing an evaluation of each of the identified treatments as the results; in which, in the display of the priority level, control of causing a display form to be different between a treatment satisfying a first condition that an evaluation exceeding a predetermined level has been received over a predetermined number of times and a treatment not satisfying the condition is performed.

Hereinafter, preferred embodiments of the present invention will be described with reference to the drawings.

First Embodiment

FIG. 1 is a block diagram illustrating a configuration of a repair place notification system according to a first embodiment. A device management system is configured such that a repair place notification server 101, a printer 102, and a personal computer (PC) 103 are able to communicate with each other through a network 100. The repair place notification server 101 is arranged on the Internet.

The network 100, for example, is a communication network such as the Internet realized by a local area network (LAN), a wide area network (WAN), a telephone line, and the like and may be configured to be able to transmit and receive data. As illustrated in FIG. 1, the repair place notification server is connected to the network 100 via a network 100-1, and the printer 102 and the PC 103 are connected to the network 100 via a network 100-2. Similar to the network 100, the network 100-1 and the network 100-2 are communication networks and may be configured to be able to transmit and receive data.

The repair place notification server 101 receives error information representing an error that has occurred in the printer 102 from the printer 102 and estimates information of one or more repair components for resolving this error. In addition, the repair place notification server 101 manages a result of component replacement performed in the market for a similar error in the past as a market result and determines a priority level of a repair component to be treated from this market result.

The repair place notification server 101 uses a cloud computing technology on the Internet. A process executed by the repair place notification server 101 in the embodiment may be realized by a plurality of servers realized by a plurality of virtual machines or a plurality of functions. As one example of the realization method, in a management system, a server executing a reception service and a server executing a process on the basis of error information received by the reception service can be mounted separately from each other. In addition, a system configuration using an on-premises physical server may be employed.

The printer 102 is one example of an image forming device such as a printer or a multifunction peripheral (MFP) and has functions of print, facsimile, copy, scan, and the like. The printer 102 transmits error information including device information to the repair place notification server 101 when its error occurrence is detected. In addition, a plurality of printers 102 may be present.

The PC 103 is one example of the information processing device, and a predetermined operating system (OS) not illustrated in the drawing is installed therein. A browser 331 to be described below is installed in the PC 103. The PC 103 transmits a repair component information acquisition request of the printer 102 to the repair place notification server 101 via the browser 331. In addition, the PC 103 receives repair component information from the repair place notification server 101 and displays the repair component information in a graphical user interface (GUI).

<Hardware Configuration>

Figure 2:
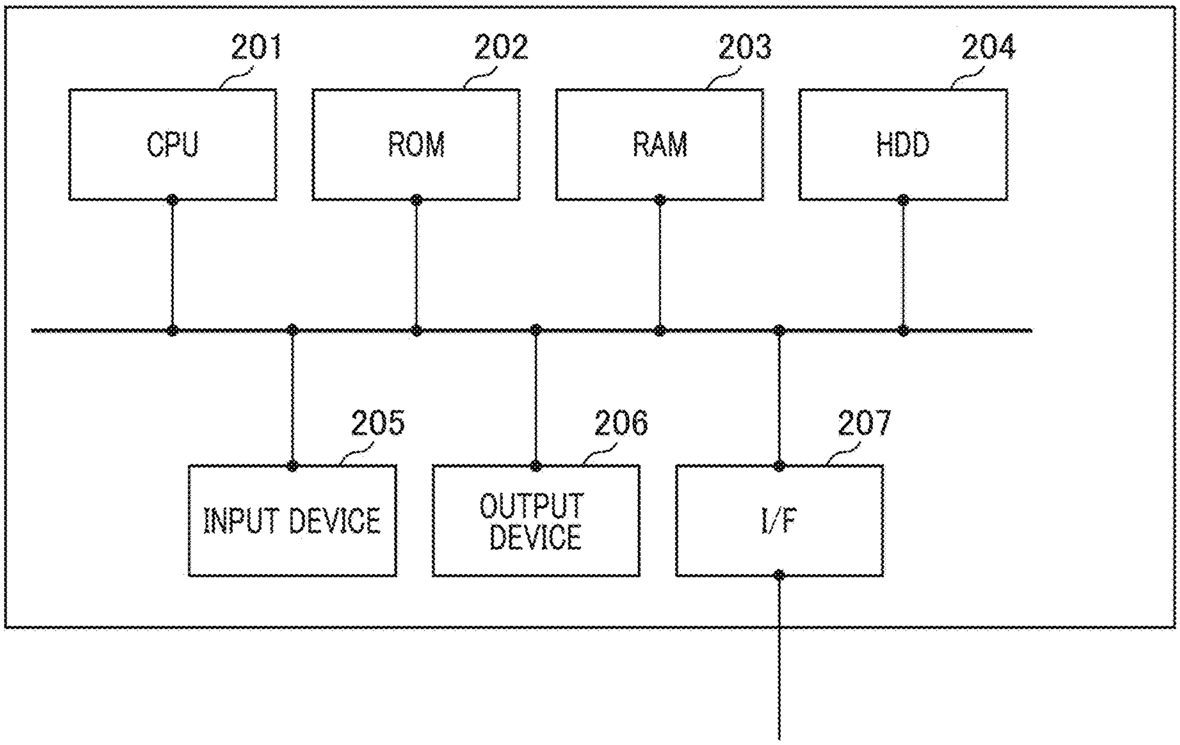
FIG. 2 is a block diagram illustrating a hardware configuration of a repair place notification server and a personal computer (PC) according to the first embodiment.

FIG. 2 is a block diagram illustrating a hardware configuration of a repair place notification server and a PC according to the first embodiment. As illustrated in FIG. 2, each of the repair place notification server 101 and the PC 103 includes a central processing unit (CPU) 201, a read only memory (ROM) 202, a random access memory (RAM) 203, and a hard disk drive (HDD) 204. In addition, as illustrated in FIG. 2, each of the repair place notification server 101 and the PC 103 includes an input device 205, an output device 206, and an input/output interface (I/F) 207.

The CPU 201 directly or indirectly controls respective devices such as the ROM 202, the RAM 203, and the like and executes a process according to the embodiment. The devices are connected to each other through an internal bus. The ROM 202 is a memory device in which a basic input output system (BIOS) and the like are stored. The RAM 203 is a direct memory device that is used as a work area of the CPU 201 and is used as a temporary memory for loading a software module used for realizing a process according to the embodiment. The HDD 204 is a joint memory device in which an OS, a software module, and the like are stored. The input device 205, for example, is a keyboard and a pointing device. The output device 206, for example, is a display. The I/F 207 connects the repair place notification server 101 or the PC 103 to the network 100.

In the repair place notification server 101 and the PC 103, after startup, the BIOS is executed by the CPU 201, and the OS is loaded from the HDD 204 into the RAM 203 to be executable. In accordance with an operation of the OS, the CPU 201 loads various software modules to be described below from the HDD 204 into the RAM 203 as necessary to be executable. Various software modules are executed and operated by the CPU 201 in cooperation with the devices described above. In addition, the I/F 207 is connected to the Internet 100 or the local network 101 and realizes communication using a communication unit described above under the control of the CPU 201 in accordance with the operation of the OS.

Figure 3:
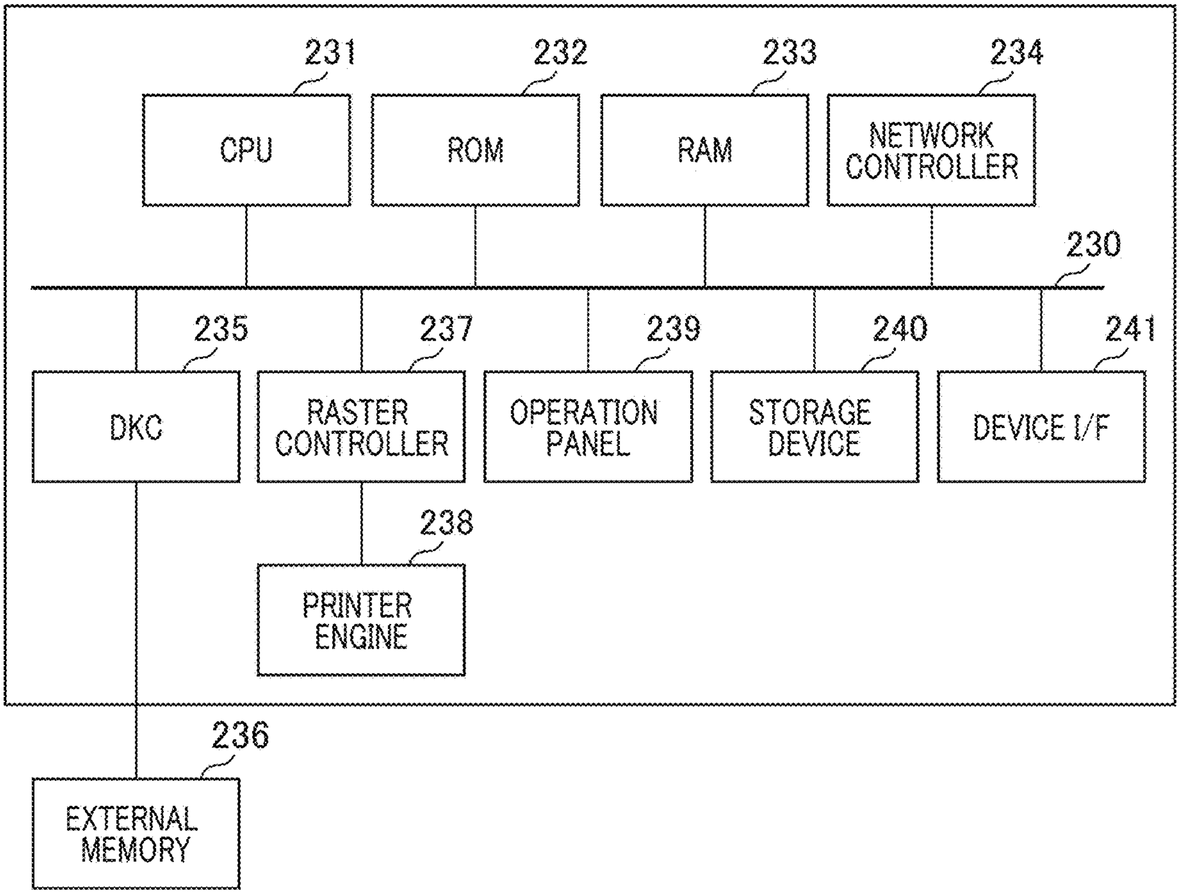
FIG. 3 is a hardware configuration diagram of a printer according to the first embodiment.

FIG. 3 is a hardware configuration diagram of the printer according to the first embodiment. As illustrated in FIG. 3, the printer 102 includes a CPU 231, a ROM 232, a RAM 233, a network controller 234, a disk controller 235, and an external memory 236. In addition, as illustrated in FIG. 3, the printer 102 includes a raster controller 237, a print engine 238, an operation panel 239, a memory device 240, and a device I/F 241. Such elements configuring the printer 102 are connected to a system bus 230. In addition, a part acquired by excluding the print engine 238 from all the elements configuring the printer 102 may be referred to as a controller responsible for a control system of the printer 102.

The CPU 231 comprehensively controls access to various devices connected to the system bus 230 by performing overall control of the printer 102. This control is on the basis of a control program and the like stored in the ROM 232 or a control program stored in the external memory 236 connected via the disk controller 235, resource data (resource information), and the like. The RAM 233 functions as a main memory, a work area, and the like of the CPU 231 and is configured to be able to expand the memory capacity using an optional RAM connected to an expansion port not illustrated in the drawing.

The memory device 240 is an external memory unit that functions as a large-capacity memory. The operation panel 239 displays a screen and accepts a user's operation instruction via the screen. In addition, a display unit such as buttons and a liquid crystal panel used for performing operations such as setting of an operation mode and the like of the printer 102, display of an operation status of the printer 102, designation of content data to be printed, and the like is also disposed on this display screen.

The network controller 234, for example, is a network interface card (NIC) and exchanges data with an external device via the network controller 234. The raster controller 237, for example, is a controller that converts print data described in a page description language (PDL) into image data. The print engine 238 forms an image on a sheet on the basis of image data input from the raster controller 237 using a known print technology. Such a print technology, for example, includes print engines of an electrophotographic type (a laser beam type), an inkjet type, and a sublimation (thermal transfer) type. The device I/F 241 is a connection I/F for an external device that can be connected using a Universal Serial Bus (USB) or the like.

<Software Configuration>

Hereinafter, operations of each server and the printer will be described using a configuration diagram of the repair place notification system. Such operations are realized by a CPU executing a program stored in the memory of each device. The schema and data of a table described below are merely examples, and the schema of the table and the formats and the like of various kinds of data are not limited to these.

Figure 4:
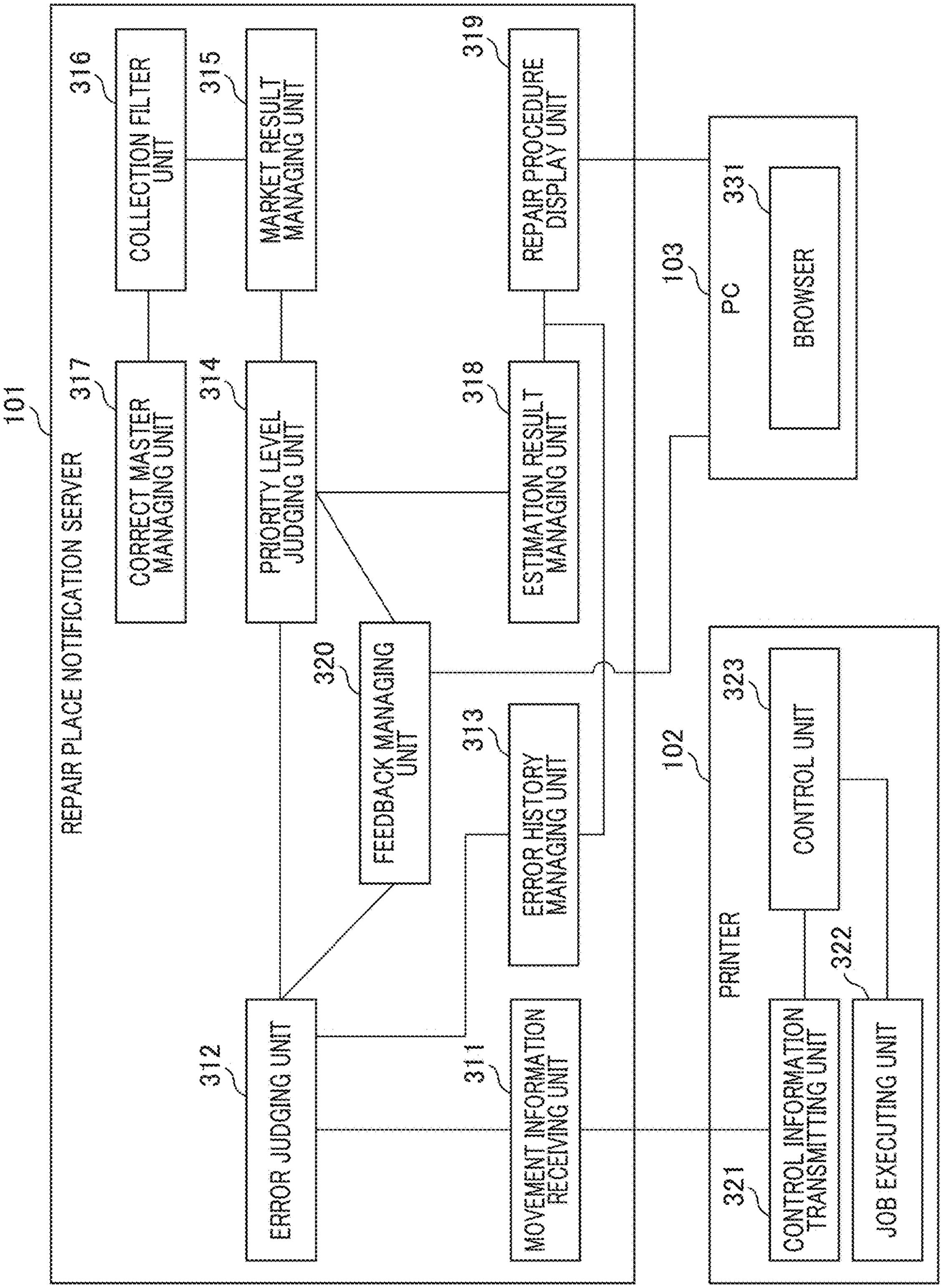
FIG. 4 is a software configuration diagram of the repair place notification system according to the first embodiment.

FIG. 4 is a software configuration diagram of the repair place notification system according to the first embodiment. The repair place notification server 101 includes an operation information receiving unit 311, an error judging unit 312, an error history managing unit 313, a priority level judging unit 314, and a market result managing unit 315. In addition, the repair place notification server 101 includes a collection filter unit 316, a correct master managing unit 317, an estimation result managing unit 318, a repair procedure display unit 319, and a feedback managing unit 320.

The operation information receiving unit 311 receives error information and operation information of the printer from the printer 102. The error judging unit 312 has an error judgment unit, and when error information is received from the operation information receiving unit 311, acquires an error history that is information on errors that occurred in the past in a printer in which an error has occurred from the error history managing unit 313. In addition, the error judging unit 312 estimates one or more repair components for resolving this error together with the received error information and a height of the possibility of the failure thereof. The error judging unit 312 transmits a result of the estimation to the priority level judging unit 314 to be described below together with the error information. In addition, the error judging unit 312 stores the error information received from the operation information receiving unit 311 in the error history managing unit 313 as an error history. Table 1 illustrates an example of a judgment result output by the error judging unit 312.

TABLE 1

| COMPONENT NUMBER | FAILURE POSSIBILITY |
|---|---|
| Part1-111 | high |
| Part2-222 | high |
| Part3-333 | high |
| Part4-444 | low |
| Part5-555 | low |

A result judged by the error judging unit 312 is a component that becomes a cause of the error and is formed from a component number for uniquely identifying the component and a failure possibility of the component. The error history managing unit 313 stores and manages error information received from the error judging unit 312 as an error history. Table 2 illustrates an example of a part of error histories managed by the error history managing unit 313.

TABLE 2

| ERROR ID | DEVICE ID | MODEL NO. | ERROR CODE | COUNTER VALUE | OCCURRENCE DATE AND TIME |
|---|---|---|---|---|---|
| Err-001 | DEV0000001 | Model-001 | E001-0001 | 5000 | 2022 Oct. 1 T12:34:56Z |
| Err-002 | DEV0000002 | Model-002 | E002-0002 | 1500 | 2022 Sep. 3 T00:00:00Z |
| Err-003 | DEV0000001 | Model-001 | E003-0001 | 2000 | 2022-Sep. 1 T00:12:34Z |

An error history is formed from an error ID for uniquely identifying an error, a device ID for uniquely identifying a printer in which the error has occurred, a model number representing a model, an error code that is a type of the occurring error, a counter value that is the number of prints at the time of occurrence of the error, and a date and time of occurrence of the error.

When a judgment result is received from the error judging unit 312, the priority level judging unit 314 acquires a market result and feedback information and determines ranking. This market result is a market result that matches a model number and an error code of error information included in a judgment result from the market result managing unit 315. The feedback information is information relating to a result of judgment acquired by the feedback managing unit 320. The priority level judging unit 314 stores a repair procedure that has been ranked in the estimation result managing unit 318 as a result of estimation.

The market result managing unit 315 maintains and manages two types of collection results for all the operations performed for resolving error that occurred in the past. One type of the collection results is a collection relating to the number of replaced components and is a collection of the number of replaced components for each model number, each error code, and each component number. In addition, one of these collection results is a collection of treatments performed for each model number and each error code as a collection relating to treatments. Table 3 illustrates an example of a part of a market replacement result that is a collection of the number of replaced components of a market result managed by the market result managing unit 315. In addition, a collection relating to treatments is represented in Tables 5 and 6 to be described below.

TABLE 3

| MODEL NO. | ERROR CODE | COMPONENT NO. | NUMBER OF REPLACEMENTS |
|---|---|---|---|
| Model-001 | E001-0001 | Part1-111 | 510 |
| Model-001 | E001-0001 | Part2-222 | 218 |
| Model-001 | E001-0001 | Part3-333 | 92 |
| Model-001 | E001-0001 | Part4-444 | 20 |
| Model-001 | E001-0001 | Part5-555 | 140 |
| Model-001 | E001-0001 | Part6-666 | 20 |
| Model-001 | E002-0002 | Part5-555 | 2000 |

A market result relating to the number of replaced components is formed from a model number that represents a model, an error code that is a type of error that has occurred, a component number of a component that has been replaced due to the error, and the number of times of replacement that is a component replacement result number. The priority level judging unit 314 determines a priority level of a repair component from a collection result of the numbers of replaced components and a judgment result acquired by the error judging unit 312. Table 4 represents an example of an estimation result of repair components estimated by the priority level judging unit 314.

TABLE 4

| DEVICE ID | ERROR CODE | COMPONENT NUMBER | PRIORITY LEVEL |
|---|---|---|---|
| DEV0000001 | E001-0001 | Part1-111 | 51.0 |
| DEV0000001 | E001-0001 | Part2-222 | 21.8 |
| DEV0000001 | E001-0001 | Part3-333 | 9.2 |
| DEV0000001 | E001-0001 | Part4-444 | — |
| DEV0000001 | E001-0001 | Part5-555 | — |

The estimation result acquired using the priority level judging unit 314 is formed from a device ID, an error code, a component number and a failure cause probability of a repair component for the error, and a priority level representing a rank of a component to be repaired. Table 5 represents an example of a part of market treatment results that are collections of treatment of market results managed by the market result managing unit 315.

TABLE 5

| MODEL NO. | ERROR CODE | TREATMENT | REPLACED COMPONENT |
|---|---|---|---|
| Model-001 | E001-001 | replace | part1-111 |
| Model-001 | E001-001 | adjust | |
| Model-001 | E001-001 | clean | |
| Model-001 | E001-001 | replace | part2-222 |
| Model-001 | E001-001 | adjust | |
| Model-001 | E001-002 | clean | |
| Model-001 | E001-002 | clean | |
| Model-001 | E001-002 | adjust | |
| Model-001 | E001-003 | replace | part3-333 |
| Model-002 | E001-001 | replace | part1-111 |
| Model-002 | E001-003 | clean | |

A market result relating to treatments includes a model number representing a model, an error code that is a type of error that has occurred, and a treatment that has performed for the error. In addition, in a case in which the treatment that has been performed is replacement, the market result relating to treatments includes a component number. Table 6 represents an example of an estimation result of a treatment judged by the priority level judging unit 314.

TABLE 6

| MODEL NO. | ERROR CODE | TREATMENT | PRIORITY LEVEL |
|---|---|---|---|
| Model-001 | E001-001 | replace | A |
| Model-001 | E001-001 | adjust | A |
| Model-001 | E001-001 | clean | B |

The estimation result of a treatment includes a device ID, an error code, treatments, and a priority level of each treatment. The feedback managing unit 320 collects feedback for treatments performed by a user for errors that occurred in the past and stores and manages the feedback for each error. A treatment score corresponding to a judgment result received from the error judging unit 312 is transmitted to the priority level judging unit 314.

An estimation of a repair component and an estimation of a treatment are managed as one estimation result. The correct master managing unit 317 has a correct master that defines a combination of a theoretically correct component and a treatment. The collection filter unit 316 excludes a combination that is not defined to be theoretically correct from combinations of repair components and treatments acquired from Tables 5 and 6 in accordance with the definition of the correct master managing unit 317. The estimation result managing unit 318 combines a priority level of a repair component judged by the priority level judging unit 314 and a treatment and manages the combination thereof. Table 7 illustrates an example in which a priority level of a repair component judged by the priority level judging unit 314 and a treatment are combined and managed. In addition, Table 7 is an example that is managed from a point of view of a priority level of a component, a device ID, an error code, a component number, a failure cause probability, replacement, cleaning, and adjustment.

TABLE 7

| PRIORITY LEVEL | DEVICE ID | ERROR CODE | COMPONENT NO. | FAILURE CAUSE PROBABILITY | REPLACEMENT | CLEANING | ADJUSTMENT |
|---|---|---|---|---|---|---|---|
| 1 | DEV0000001 | E001-0001 | Part1-111 | 51 | A | — | A |
| 2 | DEV0000001 | E001-0001 | Part2-222 | 21.8 | A | B | — |
| 3 | DEV0000001 | E001-0001 | Part3-333 | 9.2 | — | B | A |
| 4 | DEV0000001 | E001-0001 | Part5-555 | LOW POSSIBILITY | — | — | — |
| 5 | DEV0000001 | E001-0001 | Part4-444 | LOW POSSIBILITY | — | — | — |

When a repair procedure acquisition request including a device ID and an error ID is received from the browser 331 of the PC 103, the repair procedure display unit 319 acquires an error history of which a device ID and an error ID coincide therewith from the error history managing unit 313. In addition, the repair procedure display unit 319 acquires an estimation result of which a device ID and an error code coincide therewith from the estimation result managing unit 318, generates a repair procedure display screen, and returns the screen to the browser 331. Furthermore, after a user executes a treatment, the repair procedure display unit 319 generates a screen used for inputting a result of the execution and transmits the generated screen to the browser 331. When feedback information of the performed treatment, which has been input from the browser 331 by a user, is returned, the repair procedure display unit 319 transmits the feedback information to the feedback managing unit 320.

The printer 102 includes an operation information transmitting unit 321, a job executing unit 322, and a control unit 323. The operation information transmitting unit 321 transmits error information, which is collected by the control unit 323 to be described below, that has occurred in the printer 102 to the repair place notification server 101. The job executing unit 322 executes a job input to the printer 102. For example, if a print job is input, the job executing unit 322 executes a print process on the basis of the print job. The control unit 323 detects an error that has occurred in the printer 102, collects error information, and transmits the error information to the repair place notification server 101 through the operation information transmitting unit 321.

<Recommended Treatment Estimating Process>

Figure 5:
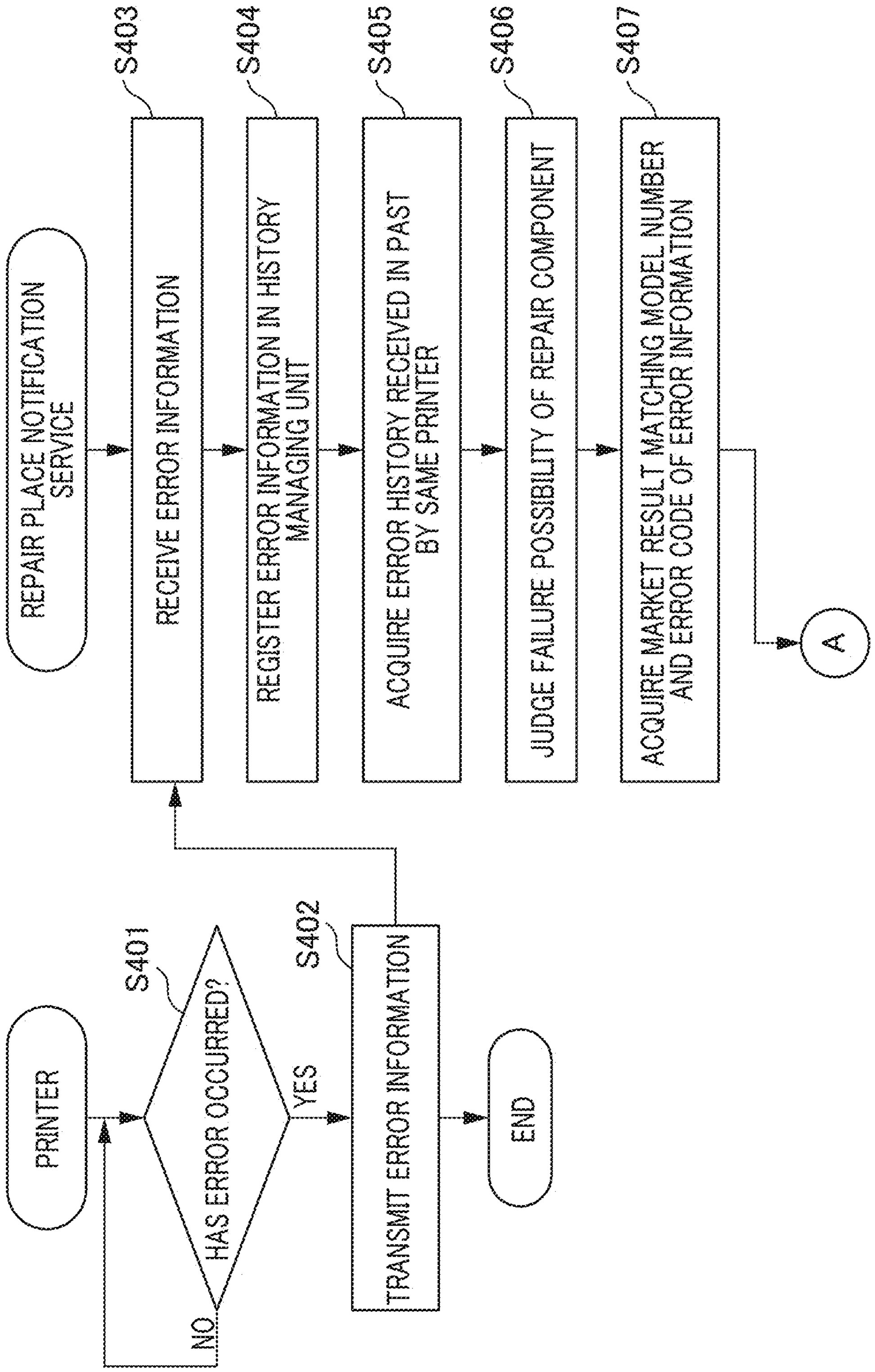
FIG. 5 is a flowchart illustrating an example of a method of calculating Table 7 in a recommended treatment estimating process executed by a priority level judging unit according to the first embodiment.
Figure 6:
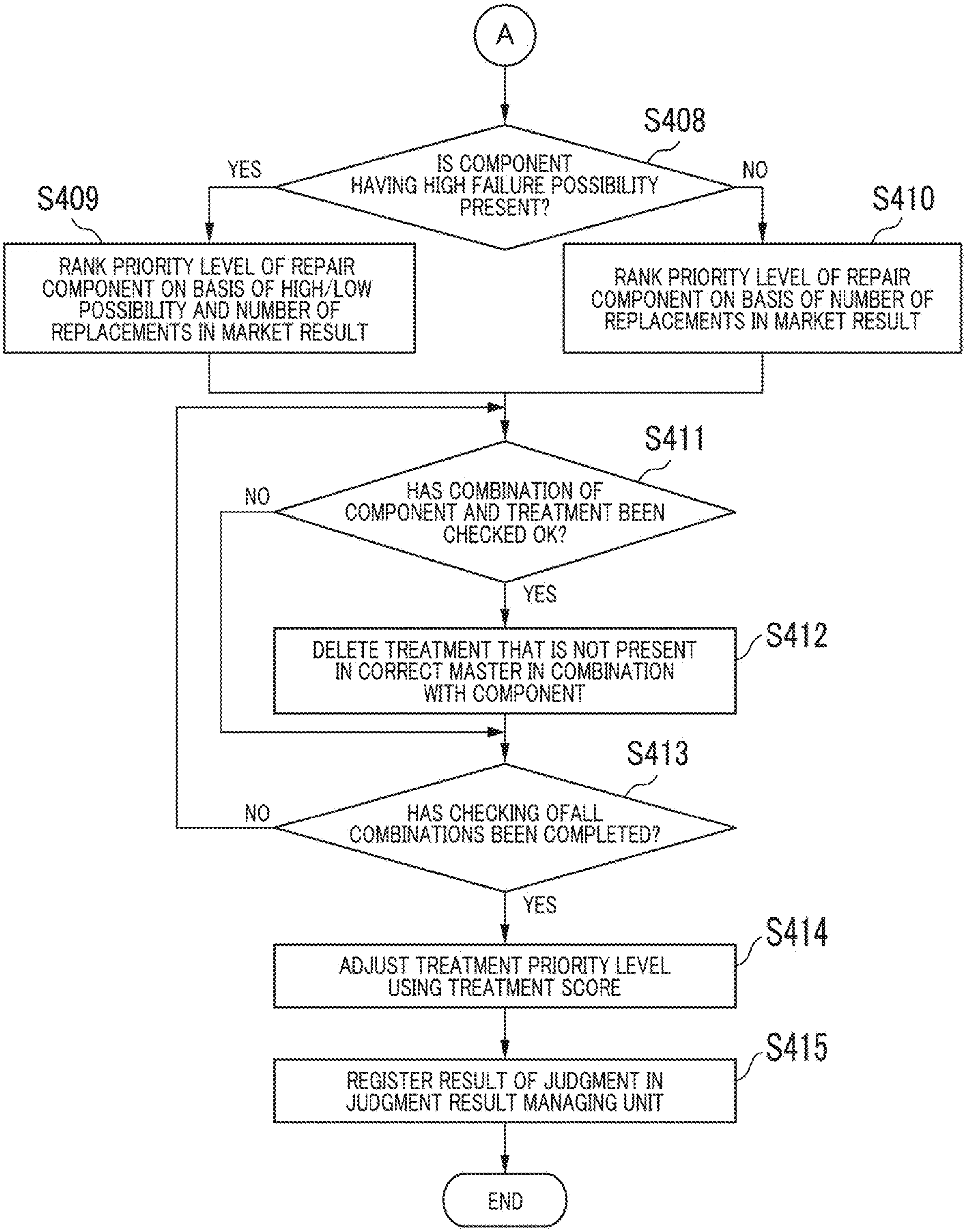
FIG. 6 is a flowchart illustrating an example of a method of calculating Table 7 in the recommended treatment estimating process executed by the priority level judging unit according to the first embodiment.

FIGS. 5 and 6 are flowcharts illustrating an example of a method for calculating Table 7 in the recommended treatment estimating process executed by the priority level judging unit according to the first embodiment. The flowchart illustrated in FIG. 5 and the flowchart illustrated in FIG. 6 are connected using a connector A.

In Step S401, the control unit 323 judges whether or not an error has occurred inside the printer 102.

In Step S402, the operation information transmitting unit 321 transmits the error information to the repair place notification server 101. In addition, by being triggered upon completion of the process of Step S402, a process of a service (a repair place notification service) provided by a management system in which the repair place notification server 101 is included starts.

In Step S403, the operation information receiving unit of the repair place notification server 101 receives error information. In this error information, an error ID, a device ID, a model number, an error code, a counter value, and an error occurrence date and time as present in an error history of Table 1 are included. In this embodiment, although an example in which a counter value is included in the error information is described, for example, a method in which a counter value is received from the printer 102 as information other than the error information as counter information, and the counter information is associated with the error information may be employed.

In Step S404, the error judging unit 312 registers received error information in the error history managing unit 313 as an error history.

In Step S405, the error judging unit 312 acquires an error history that matches the device ID included in the received error information. For example, if the device ID included in the error information is "DEV0000001," the error judging unit 312 acquires records of a first row and a third row of Table 2.

In Step S406, the error judging unit 312 outputs a list of component numbers and failure probabilities of repair components to be treated to resolve the error based on a rule-based method by using the error information received from the printer 102 and the error history acquired from the error history managing unit 313. In this embodiment, the error judging unit 312 has been described to employ a technique using a rule-based method using the received error information and the error history that has occurred in the past in the same device, the identifying of repair components is not limited thereto. For example, estimation using supervised machine learning including deep learning may also be performed.

In Step S407, the priority level judging unit 314 acquires market replacement results and market treatment results that match the model number and the error code of the error information from the market result managing unit 315. For example, if the model number and the error code included in the error information are respectively "Model-001" and "E001-0001", the priority level judging unit 314 can acquire records of the first row to the sixth row of Table 3 as market replacement results. In addition, for example, in such a case, the priority level judging unit 314 can acquire all the rows of Table 6 as market treatment results.

In Step S408, the priority level judging unit 314 checks a judgment status of a repair component output by the error judging unit 312. More specifically, in Step S408, if components with high failure probabilities and components with low failure probabilities are mixed to be present in the output list of component numbers and failure probabilities, it is determined that there is a difference in the failure probabilities among the output repair components, and the process proceeds to Step S409. On the other hand, in Step S408, if failure probabilities of all the components are low, it is determined that there is no difference in the failure probabilities among the identified components, and the process is caused to proceed to Step S410.

In Step S409, the priority level judging unit 314 ranks priority levels of repair components on the basis of failure probabilities and the numbers of replacements in market results. For example, the priority level judging unit 314 acquires the number of replacements that match the component numbers included in the list of failure probabilities. Next, the priority level judging unit 314 associates a failure cause probability with the component number as "(the number of replacements of the repair component/total number of replacements of all the components replaced due to the error)×100." In other words, the priority level judging unit 314 calculates failure cause probabilities in units of components such that the sum of the failure cause probabilities of all the replaced components for an error code that occurred in a specific model equals 100%.

In this embodiment, although the failure cause probability is calculated as the ratio of the number of replacements of a repair component to the total number of replacements of all repair components to be treated, the method of calculating a failure cause probability is not limited to the method of this embodiment but may be any method. For example, if the market result acquired in Step S407 is the first row to the sixth row of Table 3, the total number of replacements of all components that have been replaced is 1000, which is the sum of the numbers of replacements in the market result. At this time, the failure cause probability of component number "Part1-111" is "(510/1000)×100=51.0". Similarly, the failure cause probabilities of other component numbers "Part2-222", "Part3-333", "Part4-444", and "Part5-555" are respectively "21.8", "9.2", "2.0", and "14.0."

Here, the priority level judging unit 314 performs ranking of priority levels. Here, the priority level judging unit 314 ranks the priority levels based on not only the failure cause probability but also a failure probability of each component from the list of failure probabilities output by the error judging unit 312 in Step S406.

For example, the failure cause probability of "Part1-111" is "(510/1000)×100=51.0." Similarly, the failure cause probabilities of other component numbers "Part2-222", "Part3-333", "Part4-444", and "Part5-555" are respectively "21.8", "9.2", "2.0", and "14.0." Also, if the failure probabilities of component numbers "Part2-222", "Part3-333", "Part4-444", and "Part5-555" are respectively "high possibility", "high possibility", "high possibility", "low possibility", and "low possibility", the priority level judging unit 314 performs the following process. In other words, in such a case, the priority level judging unit 314 sorts repair components with "high possibility" and repair components with "low possibility" in descending order of the failure cause probability. At this time, the priority levels are "1" to "5" in order of "Part1-111", "Part2-222", "Part3-333", "Part5-555", and "Part4-444." Furthermore, the priority level judging unit 314 sets the failure cause probabilities of the repair components "Part4-444" and "Part5-555" with a low failure probability as "low possibility".

In Step S410, the priority level judging unit 314 ranks priority levels of the repair components based on the number of replacements in market results.

In Step S411, the priority level judging unit 314 judges whether or not there is a problem in a combination of a repair component identified in the repair component estimating process of Step S406 and a treatment. If it is judged that there is a problem in the combination of the repair component identified in the repair component estimating process of Step S406 and the treatment, the priority level judging unit 314 causes the process to proceed to Step S412. For example, depending on the component, there are cases in which one of treatments "replacement", "cleaning", and "adjustment" cannot be present, and, in such cases, the priority level judging unit 314 judges that there is a problem in the combination of the repair component identified in the repair component estimating process of Step S406 and the treatment. On the other hand, if it is judged that there is no problem in the combination of the repair component identified in the repair component estimating process of Step S406 and the treatment, the priority level judging unit 314 causes the process to proceed to Step S413.

In Step S412, the priority level judging unit 314 deletes treatments that are not present in the correct master from the combination of components and treatments. For this purpose, the priority level judging unit 314 defines a correct master that defines theoretically-correct treatments, filters treatments that cannot be present, and sets the priority level of the treatments that have been judged not to be able to be present to "–." In addition, the priority level judging unit 314 sets all the treatments for repair components judged to have "low possibility" by the error judging unit 312 to "–" Although the priority level judging unit 314 sets "–" even in a case in which a treatment for a repair component is present, it is distinguished from a case in which a treatment for a repair component is not present in a method illustrated in description of a UI display to be described below.

In Step S413, the priority level judging unit 314 judges whether or not verification of all the combinations of repair components and treatments has been completed. If it is judged that the verification of all the combinations of the repair components and the treatments has been completed, the priority level judging unit 314 causes the process to proceed to Step S414. On the other hand, if it is judged that the verification of all the combinations of the repair components and the treatments has not been completed, the priority level judging unit 314 causes the process to return to Step S411.

In Step S414, the priority level judging unit 314 acquires each treatment score based on feedback information from the feedback managing unit 320 and adjusts the treatment priority level using the treatment score through recalculation.

In Step S415, the priority level judging unit 314 registers the priority level of each treatment calculated in the processes performed until now in the estimation result managing unit 318 as an estimation result together with a device ID and an error code of the error information. For example, an example of the estimation result of recommended treatments calculated from the examples of Table 4 and Table 6 is Table 7. As above, the priority level judging unit 314 can estimate treatments to be recommended for an error that has occurred in the printer 102.

Figure 7:
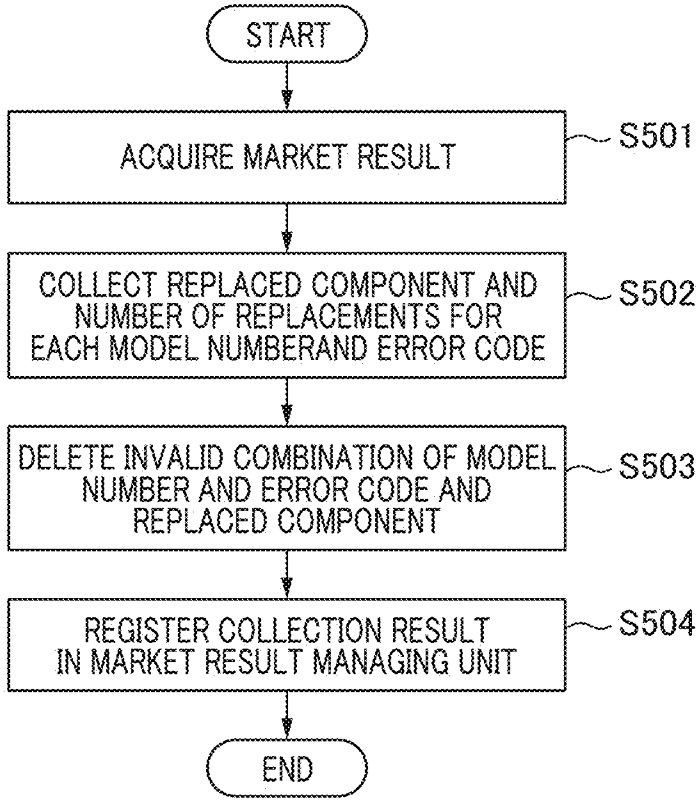
FIG. 7 is a flowchart illustrating a market result collecting process at the time of calculating Table 4 executed by the priority level judging unit according to the first embodiment.

FIG. 7 is a flowchart illustrating a market result collecting process at the time of calculating Table 4 executed by the priority level judging unit according to the first embodiment.

In Step S501, the priority level judging unit 314 acquires a market result managed by the market result managing unit 315. The market result acquired here includes information of at least a model number, an error code, and a replacement component.

In Step S502, the priority level judging unit 314 collects replacement components and the number of replacements for each model number and each error code. As a result of the collection, the priority level judging unit 314 acquires a collection result of market replacement results illustrated in Table 3 as one example.

In Step S503, the priority level judging unit 314 deletes the invalid combinations from combinations of model numbers and error codes and replacement components. For example, the priority level judging unit 314 arranges a correct master that defines a theoretically-correct treatment for a failure in the correct master managing unit 317 and filters the market replacement results maintained by the market result managing unit 315 using the collection filter unit 316.

In Step S504, the priority level judging unit 314 registers the collection result of the market replacement results calculated through the process up to Step S503 in the market result managing unit 315. In this way, the market result managing unit 315 maintains the collection result of the market replacement results.

Figure 8:
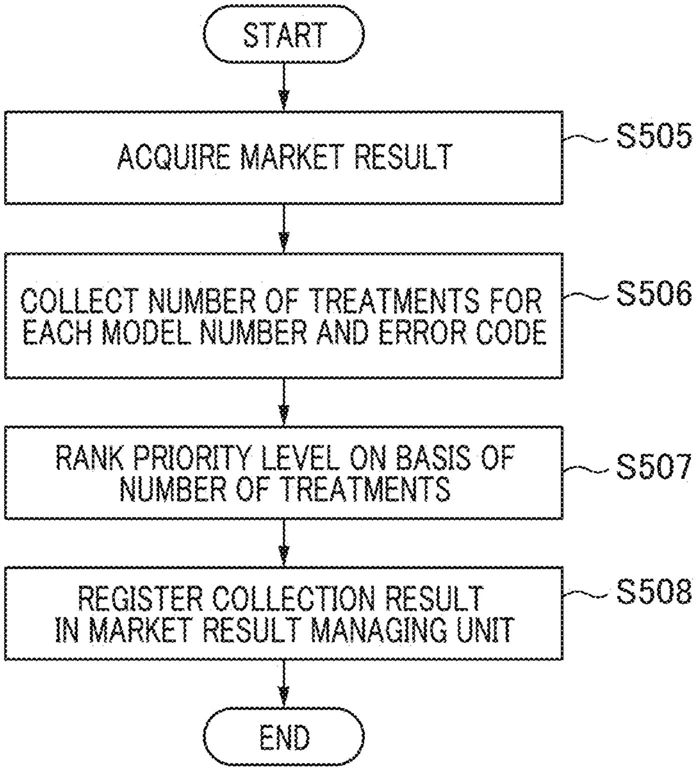
FIG. 8 is a flowchart illustrating a method of calculating Table 6 based on a market treatment result that is executed by the priority level judging unit according to the first embodiment.

FIG. 8 is a flowchart illustrating a method of calculating Table 6 based on a market treatment result that is executed by the priority level judging unit according to the first embodiment.

In Step S505, the priority level judging unit 314 acquires the market result managed by the market result managing unit 315. The market result acquired here includes information of at least a model number, an error code, and a performed treatment. Table 5 is an example of the information acquired here.

In Step S506, the priority level judging unit 314 collects the number of treatments performed for each model number and each error code.

In Step S507, the priority level judging unit 314 ranks the priority levels on the basis of the number of treatments. For example, the priority level judging unit 314 determines the priority level of each treatment on the basis of results of treatments in the market acquired in Step S506. Here, the priority level judging unit 314 classifies and collects treatments that can be acquired as market results into three types of “replacement,” “adjustment,” and “cleaning.” The priority level judging unit 314 calculates the number of treatments for each model number and each error code and acquires respective proportions as percentages.

The priority level judging unit 314 sets the priority level of a treatment of which the acquired proportion is the highest as “A.” In addition, the priority level judging unit 314 uses a treatment having the highest proportion as a reference, sets the priority level to “A” if a difference from the treatment is within 5%, sets the priority level to “B” if the difference is greater than 5% and within 20%, and sets the priority level to “C” if the difference is greater than 20%. For example, if the proportion of “replacement” is 50%, the proportion of “cleaning” is 35%, and the proportion of “adjustment” is 15%, the priority level of “replacement” is set to “A,” the priority level of “cleaning” is set to “B,” and the priority level of “adjustment” is set to “C.” An estimated result of recommended treatments in the example illustrated in Table 5 is illustrated in Table 6.

In Step S508, the priority level judging unit 314 registers the collection results up to Step S507 as market treatment results in the market result managing unit 315. In this way, the market result managing unit 315 maintains the collection result of the market treatment results.

<Treatment Priority Level Adjusting Process Using Feedback>

Figure 9:
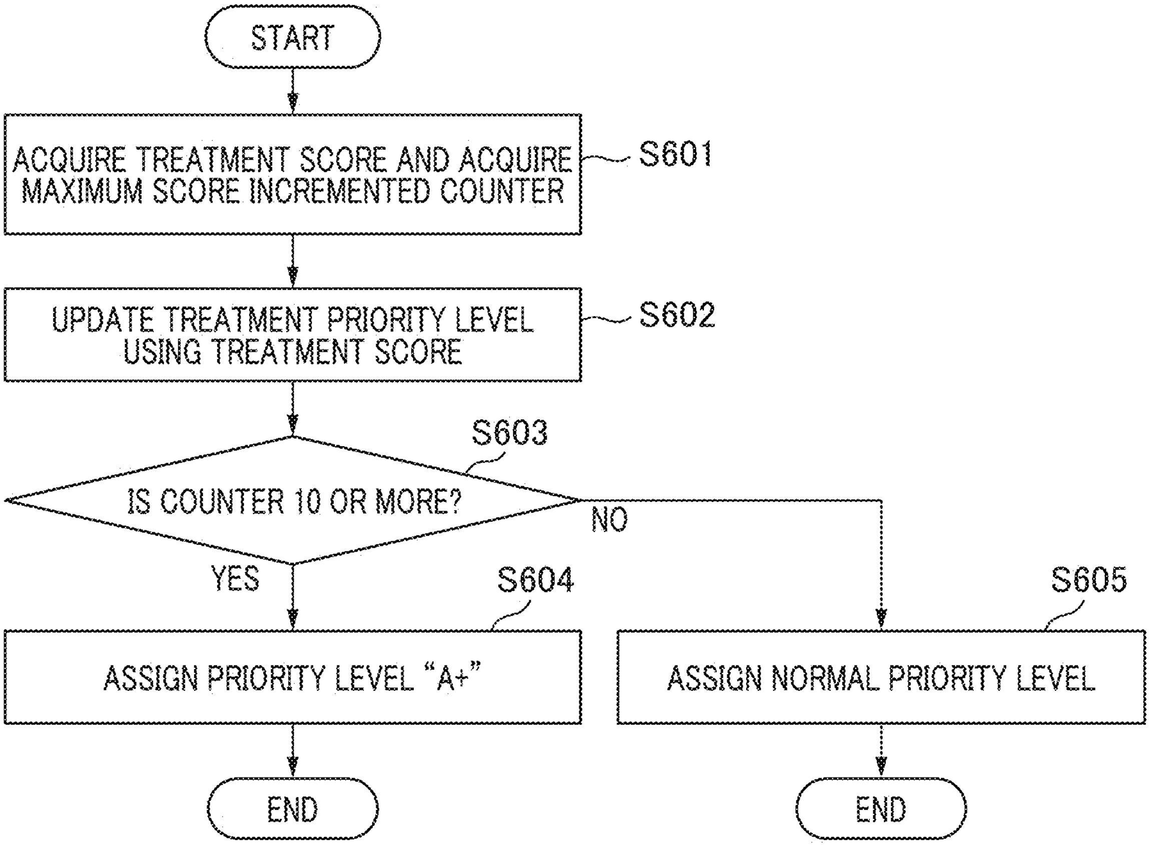
FIG. 9 is a flowchart illustrating details of a treatment priority level adjusting process using a feedback at the time of calculating Table 7 in the recommended treatment estimating process executed by the priority level judging unit according to the first embodiment.

FIG. 9 is a flowchart illustrating details of a treatment priority level adjusting process using feedback at the time of calculating Table 7 in the recommended treatment estimating process executed by the priority level judging unit according to the first embodiment. In other words, FIG. 9 is a flowchart illustrating details of Step S414 described above. The process illustrated in FIG. 9 is executed after the priority level judging unit 314 checks completion of all the combinations of repair components and treatments in Step S413 and before an estimation result is registered in the estimation result managing unit 318 in Step S415.

In Step S601, the priority level judging unit 314 acquires treatment scores managed by the feedback managing unit 320 and acquires a maximum score increment count. The treatment score is a value assigned to each of “replacement,” “adjustment,” and “cleaning.” An initial value of the treatment score is calculated on the basis of the proportion of the treatment in the market result for each error code. For example, if the proportion of “replacement” is 50%, the proportion of “cleaning” is 35%, and the proportion of “adjustment” is 15%, the initial score of “replacement” is 50, the initial score of “cleaning” is 35, and the initial score of “adjustment” is 15.

The priority level judging unit 314 reflects details of the feedback information maintained in the feedback managing unit 320 in such initial scores. In accordance with this, the treatment scores are changed. For example, the priority level judging unit 314 adds 2 to the score for treatments that have been actually executed on the basis of the feedback information and subtracts 1 from the score for the other treatments. For example, if there are two pieces of feedback information indicating execution of “replacement” in the initial score in the example described above, the score of “replacement” is updated with 54, the score of “cleaning” is updated with 33, and the score of “adjustment” is updated with 13.

In addition, when the treatment score is incremented, the priority level judging unit 314 counts the number of times score increment has been executed consecutively in the treatment having the highest treatment score. For example, if the score of “replacement” is the highest, the priority level judging unit 314 increments the count by 1 when feedback indicating that a replacement treatment has been executed is acquired and decrements the count by 1 when feedback indicating that another treatment has been executed is acquired. The count is not set to be less than 0. The priority level judging unit 314 processes feedback in the order the feedback is received.

In Step S602, the priority level judging unit 314 updates the treatment priority levels on the basis of the treatment scores acquired in Step S601. The priority level judging unit 314 re-acquires the priority levels by setting the treatment score as a proportion of each treatment using the method of market result collection process described above.

In Step S603, the priority level judging unit 314 judges whether or not the count is 10 or more. This value "10" is one example, and an arbitrary value can be adopted. If it is judged that the count is 10 or more, the priority level judging unit 314 causes the process to proceed to Step S604. On the other hand, if it is judged that the count is less than 10, the priority level judging unit 314 causes the process to proceed to Step S605.

In Step S604, the priority level judging unit 314 assigns a special priority level "A+" to the treatment with a priority level "A" of which the treatment priority level is the highest and ends the process.

In Step S605, the priority level judging unit 314 assigns a normal priority level and ends the process. For example, the priority level judging unit 314 may end the process as it is. Alternatively, the priority level judging unit 314 may return the treatment to which the priority level "A+" has already been assigned to priority level "A," "B," or "C" and end the process.

<GUI of Repair Component Display Screen>

Figure 10:
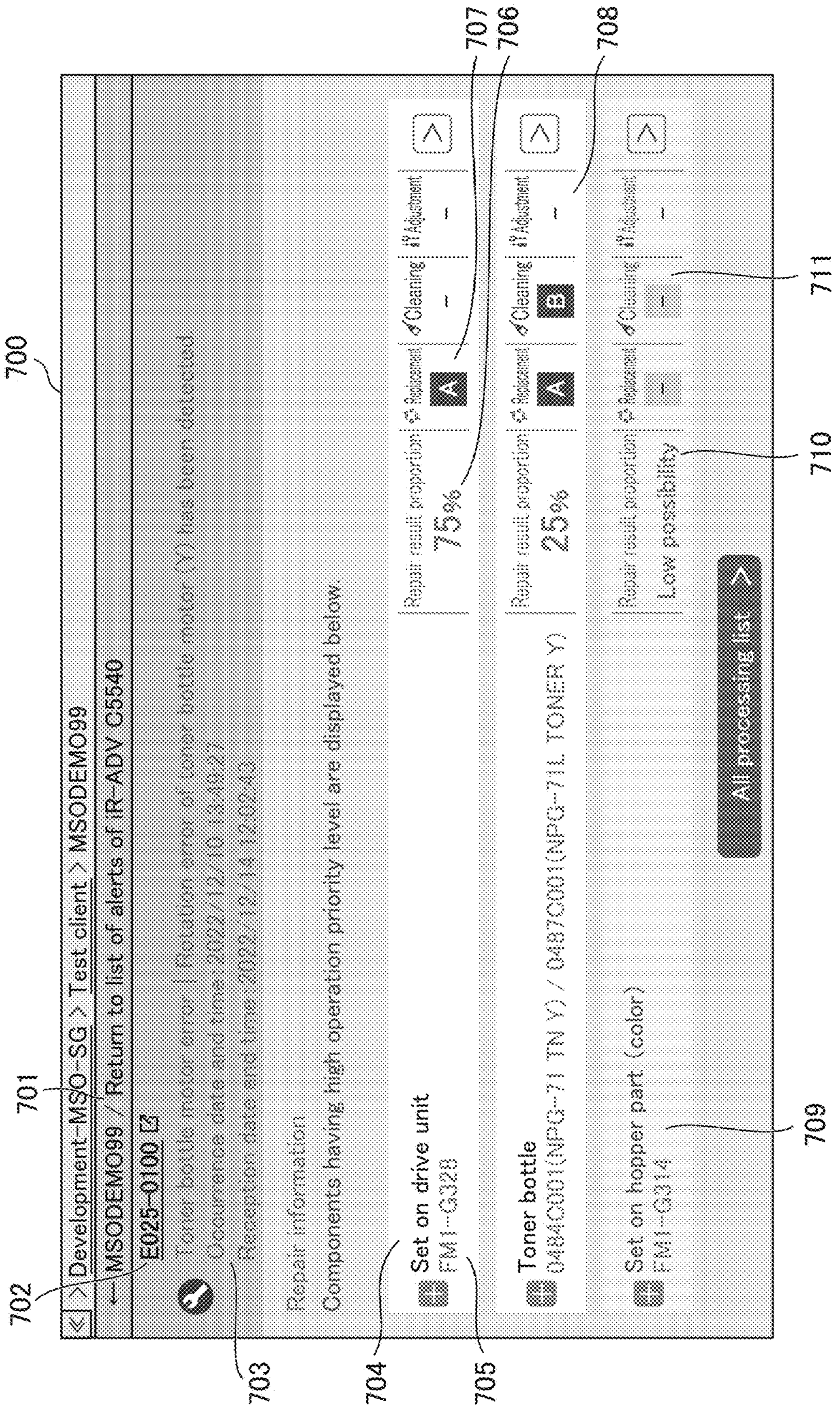
FIG. 10 is a diagram illustrating an example of a repair procedure display screen displayed in a browser according to the first embodiment.

FIG. 10 is a diagram illustrating an example of a repair procedure display screen displayed in a browser according to the first embodiment. The repair procedure display unit 319 of the repair place notification server 101, which has received a repair procedure acquisition request including a device ID and an error code from the browser 331 of the PC 103, returns a screen to the browser 331, whereby this screen is displayed in the browser 331. The method of generating the repair component display screen using the repair procedure display unit 319 has already been described, and thus description thereof will be omitted here.

The repair place notification system according to this embodiment is a system that displays a repair procedure for resolving errors in units of errors that have occurred. The repair procedure display screen 700 includes a repair procedure for the error that has been designated from the browser 331.

The repair procedure display screen 700 displays an error history and an estimation result managed by the repair place notification server 101. As a device ID 701, a device ID of an error history matching an error code of the error ID designated in the repair procedure acquisition request among error histories managed by the error history managing unit 313 is displayed. As an error code 702, an error code of an error history matching the error code of the error ID designated in the repair procedure acquisition request among error histories managed by the error history managing unit 313 is displayed.

As an occurrence date and time 703, an occurrence date and time of an error history of which an error code matches the error code designated in the repair procedure acquisition request among error histories managed by the error history managing unit 313 is displayed.

As a repair component 704, an estimation result in which the error ID of the repair procedure acquisition request is positioned among estimation results managed by the estimation result managing unit 318 is displayed. The repair procedure display unit 319 can present which component is recommended to be repaired first to a user by setting the order of estimation results displayed in the repair component 704 to be the order of highest to lowest priority level of estimation results of replacement components.

In this embodiment, a case in which the estimation results are simply displayed in order of priority level has been described as an example. However, for example, for an estimation result of which a priority level exceeds a certain threshold if there are a plurality of estimation results, an indication of a component to be treated may be further displayed using an icon or a message on the repair procedure display screen 700.

As component numbers 705, component numbers of estimation results managed by the estimation result managing unit 318 are displayed. If a component is a component judged to have low failure probability by the error judging unit 312, it is displayed with a low rank in accordance with a priority level managed by the judgment result managing unit 318, and the display itself is grayed out.

As a failure cause probability 706, failure cause probabilities of repair components managed by the judgment result managing unit 318 is displayed. The failure cause probability 706 represents a market result occupied by this component among components that have been replaced due to occurrence of the same error in the same model. Furthermore, if the component has been judged to have a low failure probability by the error judging unit 312, "low probability" is placed in the failure cause probability field.

Figure 11:
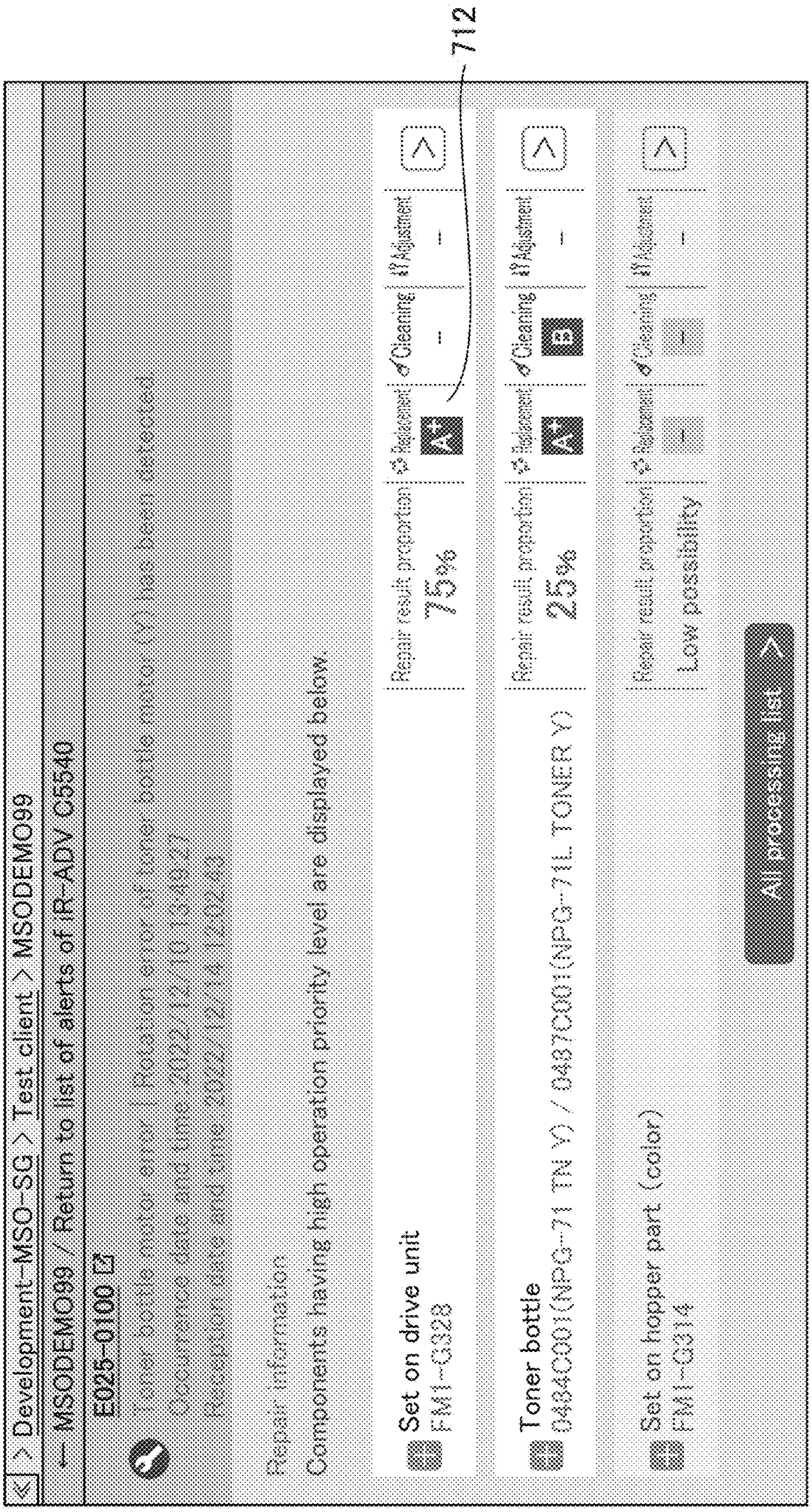
FIG. 11 is a diagram illustrating an example of the repair procedure display screen acquired in a case in which a treatment to which a treatment priority level "A+" is assigned is present as a result of performing the treatment priority level adjusting process according to the feedback illustrated in FIG. 9.

As recommended treatments 707, priority levels of "replacement," "cleaning," and "adjustment" are displayed as "A," "B," or "C" on the basis of recommended treatment estimation results managed by the judgment result managing unit 318. FIG. 11 is a diagram illustrating an example of the repair procedure display screen of a case in which a treatment to which treatment priority level "A+" is assigned is present as a result of performing the treatment priority level adjusting process using the feedback illustrated in FIG. 9. In the example illustrated in FIG. 11, as the recommended treatment 712, the priority levels of "replacement," "cleaning," and "adjustment" to which the priority level "A+" is assigned are displayed as "A+."

There may be cases in which certain treatments are not present depending on a component, and thus a recommended treatment cannot be displayed. In such cases, for example, as is managed by the estimation result managing unit 318, "–" is displayed as the recommended treatment 708. Component number 709, failure cause probability 710, and recommended treatment 711 illustrate examples of display for components judged to have "low probability" by the error judging unit 312. In this case, in accordance with priority levels managed by the judgment result managing unit 318, they are displayed in a low rank, and the display itself is grayed out. In addition, although "–" is displayed also for the treatment, by applying a background color, it is distinguished from "–" displayed if no treatment is present (not a theoretically-correct treatment).

In this way, repair components used for resolving errors that have occurred in the printer can be displayed also for treatments that are recommended with being ranked in order of highest to lowest error resolving possibility.

Second Embodiment

In the first embodiment, it is assumed that the error judging unit 312 outputs one or more pieces of information relating to components having a high failure probability in Step S406. However, there are also cases in which the error judging unit 312 outputs only information relating to components having a low failure probability without outputting information relating to components having a high failure possibility. In such cases, according to the processes of the first embodiment, all the components are grayed out in display, the failure cause probability is displayed as "low possibility", all of "A", "B", and "C" are not displayed also for priority levels of treatments, and information sufficient to a user cannot be provided.

In this embodiment, an example in which appropriate information is displayed in repair components 704 even if the error judging unit 312 outputs only information relating to components having a low failure probability will be described. In the second embodiment, description of the same details as those of the first embodiment will be omitted.

The software configuration according to the second embodiment is similar to the configuration illustrated in FIG. 3. In the first embodiment, it is assumed that the error judging unit 312 outputs information relating to components having a high possibility of one or more failures, and the process of Step S409 is performed after the judgment of Step S408. However, in the second embodiment, a case in which information relating to all the components that has been output represents a low failure possibility is considered, and thus the process of Step S410 is performed.

In the case of Table 3 according to the second embodiment, processing of a priority level and a failure cause probability, which is performed using a difference between the failure possibilities of components output by the error judging unit 312 in the first embodiment, is not performed. Estimation results according to the second embodiment, which correspond to Table 7 of the first embodiment, are represented in Table 8.

TABLE 8

| PRIORITY LEVEL | DEVICE ID | ERROR CODE | COMPONENT NO. | FAILURE CAUSE PROBABILITY | REPLACEMENT | CLEANING | ADJUSTMENT |
|---|---|---|---|---|---|---|---|
| 1 | DEV0000001 | E001-001 | Part1-111 | 51 | A | — | A |
| 2 | DEV0000001 | E001-001 | Part2-222 | 21.8 | A | B | — |
| 3 | DEV0000001 | E001-001 | Part5-555 | 14 | A | B | — |
| 4 | DEV0000001 | E001-001 | Part3-333 | 9.2 | A | B | A |
| 5 | DEV0000001 | E001-001 | Part4-444 | 2 | A | — | — |

Table 8 represents a priority level, a device ID, an error code, a component number, a failure cause probability and priority levels of treatments of replacement, cleaning, and adjustment for each component. A calculation method for Table 8 is the same as that according to the first embodiment except for editing according to a difference between a component for which a high failure possibility is output by the error judging unit 312 and a component for which a low failure possibility is output. In addition, the component number 709, the failure cause probability 710, and the recommended treatment 711 are not displayed. All the repair components are displayed in colors, and failure cause probabilities and priority levels of treatments are displayed as well.

Third Embodiment

In the second embodiment, the display of a case in which the failure possibilities of all the components are judged to be low by the error judging unit 312 has been proposed. In the specification of this second embodiment, the same display is formed in a case in which a failure possibility is high for all the components and in a case in which a failure possibility is low for all the components. However, between a case in which failure possibilities of all the components are judged to be high by the error judging unit 312 and a case in which failure possibilities of all the components are judged to be low, there is a difference in information that is used, and thus the accuracy of estimation is different. However, in the second embodiment, the display is the same, and thus a user cannot determine a difference in this estimation accuracy.

Figure 12:
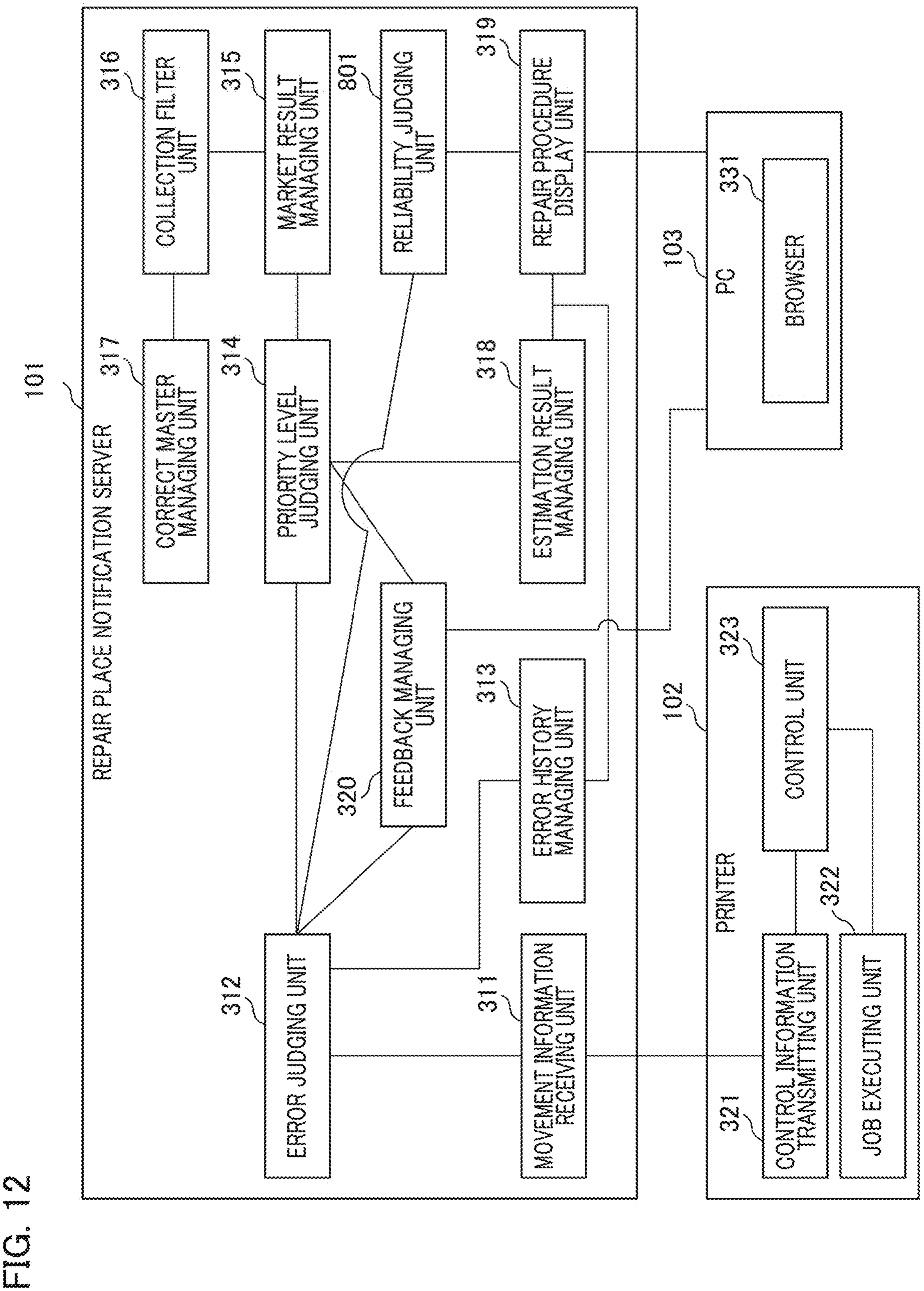
FIG. 12 is a software configuration diagram of a repair place notification system according to a second embodiment.

FIG. 12 is a software configuration diagram of a repair place notification system according to the second embodiment. As illustrated in FIG. 12, a repair place notification server 101 includes a reliability determining unit 801. The reliability determining unit 801 displays an icon that represents a degree of reliability that is accuracy of estimated information. Regarding the degree of reliability, the level of the degree of reliability is adjusted up or down by one step depending on whether or not "high possibility" is included in a failure possibility of each component included in a list of failed components output by the error judging unit 312.

In addition, the degree of reliability is used for judging the state of the market result managed by the market result managing unit 315. More specifically, the degree of reliability decreases if the market result does not reach a reliable parameter. For this reason, the reliability determining unit 801 adjusts the degree of reliability up or down by one step depending on whether or not the parameter is a predetermined threshold or more. Table 9 represents examples of degrees of reliability determined by the reliability determining unit 801.

TABLE 9

| ESTIMATION ACCURACY DETERMINING MATRIX | | MARKET RESULT: LESS THAN THRESHOLD | MARKET RESULT: THRESHOLD OR MORE |
|---|---|---|---|
| ENGINE | INCLUDING HIGH POSSIBILITY | ** | *** |
| | NOT INCLUDING HIGH POSSIBILITY | * | ** |

The reliability determining unit 801 determines the degree of reliability from a point of view of whether or not a component having a "high possibility" is included in the output of the error judging section included in the error judging unit 312 and a point of view of whether or not the parameter of the market result is a threshold or more. As illustrated in Table 9, the number of star marks that are examples of icons representing degrees of reliability is increased as there is more information that can be used.

Figure 13:
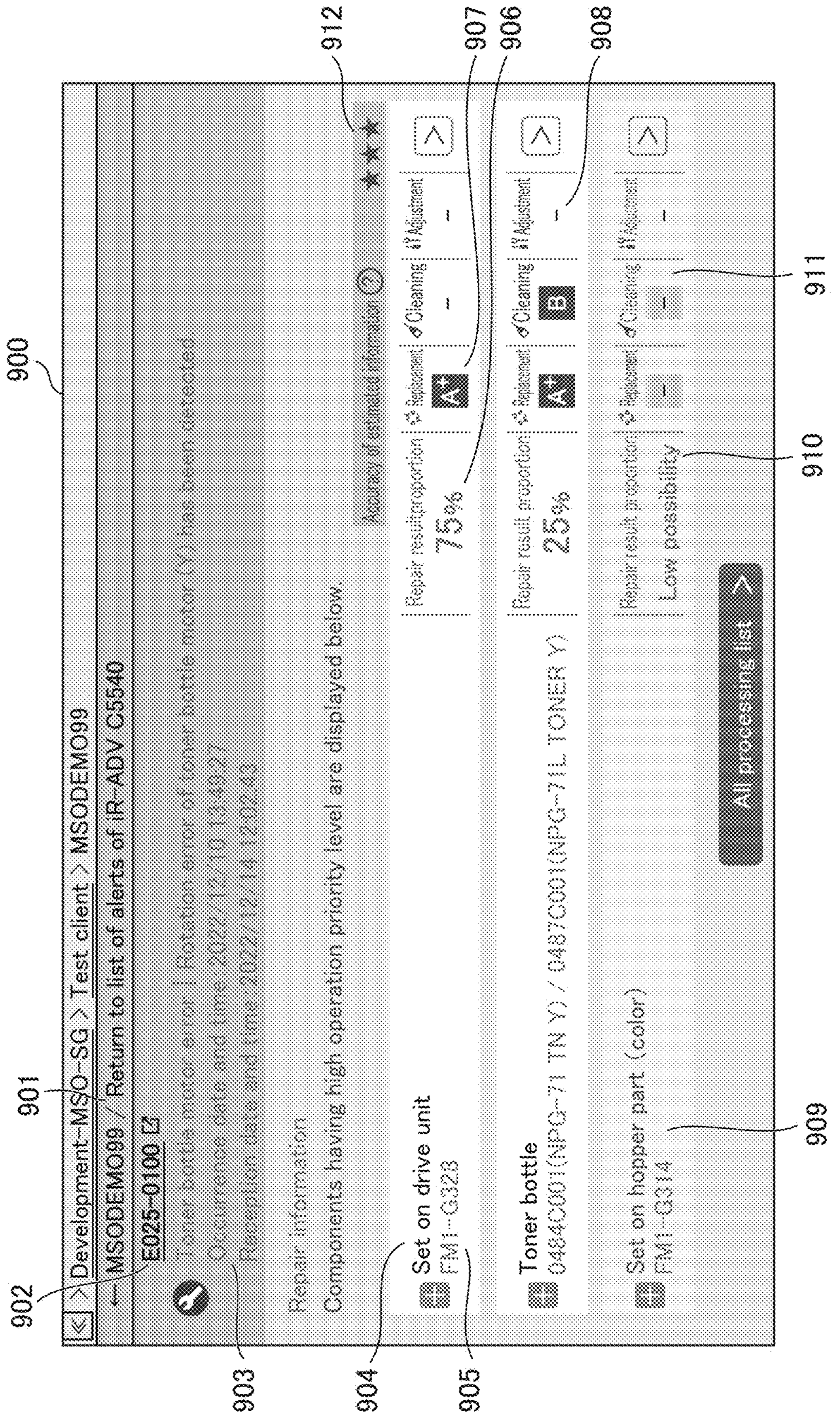
FIG. 13 is a diagram illustrating an example of a repair procedure display screen displayed in a browser according to the second embodiment.

FIG. 13 is a diagram illustrating an example of a repair procedure display screen displayed in a browser according to the second embodiment. A degree of reliability determined by the reliability determining unit 801 is maintained by the repair procedure display unit 319 and is displayed by the reliability display unit 912.

Similar to the screen illustrated in FIG. 10 or FIG. 11, the other elements illustrated in FIG. 10 are displayed through a process that is similar to that according to the first embodiment. As recommended treatment 907, the priority levels of "replacement," "cleaning," and "adjustment" are displayed as "A," "B," or "C" on the basis of a result of recommended treatment estimation managed by the judgment result managing unit 318. However, if a treatment to which the treatment priority level "A+" is assigned is present as a result of the treatment priority level adjusting process using feedback illustrated in FIG. 9, as the recommended treatment 907, the priority level of the corresponding treatment is displayed as "A+".

Fourth Embodiment

In the first embodiment, for a treatment defined not to be present in the correct master that defines a theoretically-correct treatment, "–" is displayed. However, if a user performs a treatment displayed with "–" and gives feedback in spite of "–" being displayed, when the treatment score for a treatment that is regarded to be non-present changes to adjust the priority level, the definition of the correct master becomes vague.

For this reason, in the third embodiment, the handling of feedback information when a treatment defined to be non-present in the correct master is actually executed will be described. The software configuration according to the third embodiment is the same as the configuration illustrated in FIG. 4, and description of the same details as those of the first embodiment will be omitted.

In the third embodiment, similar to the first embodiment, feedback information for treatments defined to be non-present in the correct master (hereinafter referred to as "–" treatments) is accumulated in the feedback managing unit 320. However, the treatment priority level adjusting process using feedback information through feedback is not performed by the priority level judging unit 314. In addition, the process of changing the treatment score of the "–" treatment is not executed. Furthermore, details of the treatment score for "–" treatments are not reflected on the GUI at all.

The feedback managing unit 320 visualizes and transmits an accumulation status of feedback information indicating that the "–" treatment has been executed to the correct master managing unit 317. In accordance with this, a staff responsible for the development and adjustment of the correct master can use the information for reducing a difference between a user and the correct master.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-143724, filed Sep. 5, 2023, which is hereby incorporated by reference wherein in its entirety.

What is claimed is:

1. An information providing system comprising:

one or more memories storing instructions, and one or more processors capable of executing the instructions causing the information providing system to:

manage treatment data representing treatments performed for resolving errors that have occurred in an image forming device in the past and evaluation data representing evaluations of the treatments performed for resolving the errors that have occurred in the image forming device in the past as results;

identify treatments required for resolving an error that has occurred in the image forming device;

control display of a priority level representing an extent to which each of the identified treatments is performed with priority; and further manage evaluation data representing an evaluation of each of the identified treatments as the results;

wherein, in the display of the priority level, control of causing a display form to be different between a treatment satisfying a first condition that an evaluation exceeding a predetermined level has been received over a predetermined number of times and a treatment not satisfying the condition is performed.

2. The information providing system according to claim 1, wherein treatment data of at least one of the identified treatments is further managed as the results; and wherein, in the display of the priority level, control of displaying a predetermined icon for a treatment satisfying a second condition of being executed over a predetermined number of times is performed.

3. The information providing system according to claim 1, wherein treatment data representing a treatment of which the priority level is not displayed is managed without being processed as the results.

4. The information providing system according to claim 1, wherein, if treatment data representing a treatment of which the priority level is not displayed is received, the evaluation of the treatment is not changed.

5. The information providing system according to claim 1, wherein, if treatment data representing a treatment of which the priority level is not displayed is received for the first time, a value represented by the evaluation data of the treatment is managed as zero.

6. The information providing system according to claim 1, wherein, if treatment data representing a treatment of which the priority level is not displayed is received, the display form of the priority level of the treatment is not changed.

7. The information providing system according to claim 1, wherein, if treatment data representing a treatment of which the priority level is not displayed is received, the evaluation data of the treatment is further managed as the results.

8. A method for an information providing system, the method comprising, managing treatment data representing treatments performed for resolving errors that have occurred in an image forming device in the past and evaluation data representing evaluations of the treatments performed for resolving the errors that have occurred in the image forming device in the past as results;

identifying treatments required for resolving an error that has occurred in the image forming device; and controlling of display of a priority level representing an extent to which each of the identifier treatments is performed with priority; and further managing evaluation data representing an evaluation of each of the identified treatments as the results;

wherein, in the display of the priority level, control of causing a display form to be different between a treatment satisfying a first condition that an evaluation exceeding a predetermined level has been received over a predetermined number of times and a treatment not satisfying the condition is performed.

* * * * *